United States Patent
Cohen-Arazi et al.

(10) Patent No.: US 7,932,089 B2
(45) Date of Patent: Apr. 26, 2011

(54) SIMULTANT MATERIAL AND METHOD FOR MANUFACTURE THEREOF

(75) Inventors: Yael Cohen-Arazi, Kfar Vradim (IL); Tamar Kaully, Adi (IL); Edith Sokol, Zichron Yaacov (IL); Aviv Nisan, Kiryat Yam (IL)

(73) Assignee: Rafael Armament Development Authority Ltd., Haifa (IL)

( * ) Notice: Subject to any disclaimer, the term of this patent is extended or adjusted under 35 U.S.C. 154(b) by 727 days.

(21) Appl. No.: 11/660,737

(22) PCT Filed: Aug. 8, 2005

(86) PCT No.: PCT/IL2005/000853
§ 371 (c)(1),
(2), (4) Date: Jul. 5, 2007

(87) PCT Pub. No.: WO2006/021949
PCT Pub. Date: Mar. 2, 2006

(65) Prior Publication Data
US 2007/0281358 A1 Dec. 6, 2007

(30) Foreign Application Priority Data
Aug. 23, 2004 (IL) .......................................... 163675

(51) Int. Cl.
*G01N 33/22* (2006.01)
(52) U.S. Cl. ....... 436/8; 252/408.1; 149/109.4; 102/355
(58) Field of Classification Search ... 436/8; 252/408.1; 149/109.4; 102/355
See application file for complete search history.

(56) References Cited

U.S. PATENT DOCUMENTS

| 3,119,705 A * | 1/1964 | Kintish et al. ................ 106/220 |
| 3,457,329 A * | 7/1969 | Sherman et al. .............. 525/178 |
| 4,293,351 A | 10/1981 | Johannes |
| 4,332,631 A | 6/1982 | Herty, III et al. |
| 5,359,936 A | 11/1994 | Simpson et al. |
| 5,413,812 A | 5/1995 | Simpson et al. |
| 5,648,636 A | 7/1997 | Simpson et al. |
| 5,756,006 A | 5/1998 | Reed, Jr. et al. |
| 5,958,299 A | 9/1999 | Kury et al. |

(Continued)

FOREIGN PATENT DOCUMENTS

DE 30 46 562 12/1980

(Continued)

OTHER PUBLICATIONS

Unknown, Abstract of: "Coon et al., 'Data base users' guide for the Chemical Agent Simulant Data Center.' *Chem. Res., Dev. Eng. Cent.*, Aberdeen Proving Ground, MD USA." *Chemical Abstracts*, v.11:16, p. 167 (1989).

*Primary Examiner* — Maureen M Wallenhorst
(74) *Attorney, Agent, or Firm* — The Nath Law Group; Susanne M. Hopkins; Ari G. Zytcer

(57) ABSTRACT

A simulant material for simulating hazardous materials is provided. The simulant material includes a quantity of at least one explosive material and at least one inert material. The simulant material is a non-explosive material and is in the form of a homogenous, flexible and non-particulated material. Also provided is a method for manufacturing such a simulant material.

15 Claims, 2 Drawing Sheets

U.S. PATENT DOCUMENTS

| | | | |
|---|---|---|---|
| 6,797,944 B2 * | 9/2004 | Nguyen et al. | 250/286 |
| 7,694,628 B2 * | 4/2010 | Adebimpe et al. | 102/355 |
| 2006/0037509 A1 * | 2/2006 | Kneisl | 102/355 |
| 2009/0062386 A1 * | 3/2009 | Martin et al. | 514/547 |

FOREIGN PATENT DOCUMENTS

| | | |
|---|---|---|
| DE | 37 14 453 | 12/1988 |
| DE | 37 29 630 | 3/1989 |
| GB | 2 326 408 | 12/1998 |

* cited by examiner

SIMULTANT MATERIAL AND METHOD FOR MANUFACTURE THEREOF

FIELD OF THE INVENTION

This invention relates generally to simulanting materials suitable for use as training articles for training and calibration purposes, in particular in the training of detecting dogs and security personnel, and for calibrating sensitive analytical instruments. The materials are safe for handling (use, training, storage etc.) on the one hand and, on the other hand, are applicable in a variety of applications and compatible with different requirements.

BACKGROUND OF THE INVENTION AND STATUS OF PRIOR ART

Various methods and apparatus have been developed for detecting explosives and other hazardous materials, e.g. chemical agents used in the course of manufacturing nuclear weapons and chemical weapons, as well as for detection of drugs. All such materials are hereinafter in the specification and claims referred to collectively as hazardous materials.

As the concern of terrorist and criminal actions increases worldwide, the need to develop effective detection of hazardous materials increases, in particular when concerned with explosive materials, however not restricted thereto. One common way is use of detecting dogs and sensitive analytical technologies. To enable the training of such dogs and their accompanying personnel, and/or the calibrating of sensitive instruments, it has been necessary to use significant quantities of explosives (in most cases 'neat' materials) which pose a hazard as well as preventing dog training or instrument utilization in some critical or restricted areas. For example, during the training and utilization of detecting dogs, quantities of hazardous explosives are carried in vehicles and placed in buildings which resulted in the possibility of explosive detonation. The need for explosive materials thus complicates detection training in populated areas such as airports, train stations, office buildings, etc. Furthermore, use of explosive materials is admitted for authorized personnel, and also, special logistics are required, e.g. for storage, transportation, etc.

Similarly, calibrating of sensitive analytical instruments used for the detection of explosives could only be accomplished by the presence of 'neat' explosives, though in small quantities, but creating a hazard to the handling personnel and to the equipment. Thus, there has been a need to develop safe methods of training explosives detecting dogs and personnel, and/or calibrating sensitive analytical instruments, and other applications, without the use of actual hazardous explosives.

Apart for safety issues and logistic complications concerned with hazardous materials, in the case of drugs detection training, a different issue evolves when utilizing actual drugs. This positions a problem with criminals which may take advantage of different situations and try some criminal acts.

U.S. Pat. Nos. 5,359,936 and 5,413,812 (the later divided out of U.S. Ser. No. 08/027,366, now said U.S. Pat. No. 5,359,936) disclose an explosive simulant which is chemically equivalent to an explosive, but is not detonable. The simulants are manufactured either by slurry coating technique to produce a material with a very high binder to explosive ratio without masking the explosive vapor, or by coating inert beads with thin layers of explosive molecules.

U.S. Pat. No. 5,648,636, (which is a Combination-In-Part of U.S. Ser. No. 08/221,568 and is now said U.S. Pat. No. 5,413,812), discloses a simulant which is chemically equivalent to an explosive, but is not detonable or explodable. The simulant is a combination of an explosive material with an inert material, either in a matrix or as a coating, where the explosive has a high surface ratio but small volume ratio. The simulant has particular use in the training of explosives detecting dogs, calibrating analytical instruments which are sensitive to either vapor or elemental composition, or other applications where the hazards associated with explosives is undesirable but where chemical and/or elemental equivalence is required. The explosive simulants may be fabricated by the use of standard slurry coatings to produce a material with a very high binder to explosive ratio without masking the explosive vapor, or by coating inert substrates with thin layers of explosive molecules.

Other simulant materials are disclosed, for example, in U.S. Pat. Nos. 5,756,006 and 5,958,299.

The present invention satisfies the need of providing simulant materials which are chemically equivalent to the actual hazardous materials required for training and for operational uses, in nearly all aspects. However in the case of explosive materials simulants they cannot chemically react violently (no detonation, or deflagration, or explosion), whereby the use of actual hazardous explosives is eliminated, thereby removing the hazards associated with the use of explosives. Furthermore, the simulant materials can also be used for detection by instruments that do not rely on odors, e.g. density, crystallographic structure, chemical structure, etc.

In connection with explosives (defined herein to mean explosives as well as gun and rocket propellants), an explosion is defined as a rapid energy release while detonation is energy release at supersonic velocities. Thus a non-detonable material may still be explodable. Therefore, safe materials are required, which are referred to in the art as Non-hazardous Explosives for Security, Training and Testing (NESTT). Hence safe use NESTT materials are those which are non-detonable and also non-explodable.

The materials according to the above prior art patents are in the form of loose material, which have some deficiencies, such as causing an irritation to the sniffing dogs, difficulties in placing/applying the material, the need for special 'sniffing containers', etc.

Hereinafter in the specification and claims, the term 'non-explosive material' denotes a material which may be considered as a non-explodable, non-deflagradable and non-detonable material (i.e. compatible as a non class 1 material, as per definitions of the UN Regulations, the US Department Of Transportation (DOT) and other safety standards).

It is an object of the present invention to provide simulant materials which as a primary condition are safe for handling, i.e. being non-explosive materials and substantially non-hazardous, and which on the other hand are easy and cheap to manufacture and are easily applicable in a variety of forms and for different applications. It is a further object of the present invention to offer a method for manufacturing simulant materials of the aforementioned type.

SUMMARY OF THE INVENTION

In view of the foregoing, the main object of this invention is to provide a simulant material and articles made thereof, for simulating hazardous materials useful as articles for training and calibration purposes, in particular in the training of detecting dogs and security personnel, and for calibrating sensitive analytical instruments, which is safe, requires simple logistics and eliminates crime activity occurring in particular at the presence of drugs.

More particularly, an object of this invention is manufacture of a non-explosive simulant material comprising an explosive material and an inert material; wherein the simulant material is in the form of a homogenous non-particulated material.

A salient feature of the invention is that the simulant material simulates explosive materials in four main aspects:
- 'odor print' of the simulant material resembles that of the simulated material;
- the simulant material has like chemical structure properties of the simulated material, though in substantially reduced ratio;
- the simulant material has like crystallographic structure as of the simulated material;
- the simulant material is user and environmentally friendly and safe.

The simulant material according to the present invention has many significant features and advantages, for example:
- the simulant material is available in solid form or in paste form, where it may be applied manually or by different paste/putty applicators;
- where the simulant material is in solid form it may be in the form of spaghetti-like elements or as continuous sheet of material, where it may be worked in different ways including cutting, piercing and may be imparted any desired shape, manually or by tools;
- the simulant material may be readily used (self sustained) eliminating use of special containers;
- when in solid form, the simulant material is flexible/pliable;
- the material may be adhered using readily available adhesives;
- the material is foldable;
- the simulant material is chemically and mechanically stable;
- the simulant material is not effected by common organic dissolvers, rendering it resistant in different operative conditions;
- the simulant material is free of non inherently associated volatiles (e.g. solvents), whereby sniffing dogs or 'sniffers' (analytical instruments for detection of hazardous materials) are not likely to be confused/misled;
- a wide variety of 'cocktails' may be prepared for simulation of different materials, however using one simulant article only. Such cocktails may also involve simulation of explosive materials, chemical agents and drugs, as well as deliberately confusing/masking agents;
- the simulant agent may comprise different additives, e.g. fire retardants, pigment agents so as to offer visible differentiation between such articles; metallic powder (ferrous, tungsten, etc.) so as to render the simulant article detectable also by magnetometers, etc;
- the manufacturing process of the simulant material and articles is rapid and at relatively low cost as compared with other simulant materials.
- the simulant material according to the invention is resistant to hostile environments such as, humidity, sea water, corrosive conditions, oils and fuels, extreme temperature condition (e.g. in the range of about −54° C. to +70° C.), UV resistance, radiation resistance.
- density of the simulant material could be adjusted to resemble that of the simulated material;

It is a further an object of the present invention to provide a method for manufacturing simulant materials of the above disclosed type, and simulant articles made thereof. Said method comprising the steps of:

obtaining a mixture of at least one explosive material with at least one inert material; and
mixing the materials to obtain a homogenous, flexible and non-particulated, paste-like material.

BRIEF DESCRIPTION OF THE DRAWINGS

For a better understanding of the invention as well as other objects and further features thereof, reference is now made to the annexed drawings wherein.

DETAILED DESCRIPTION OF THE INVENTION

Figure 1:
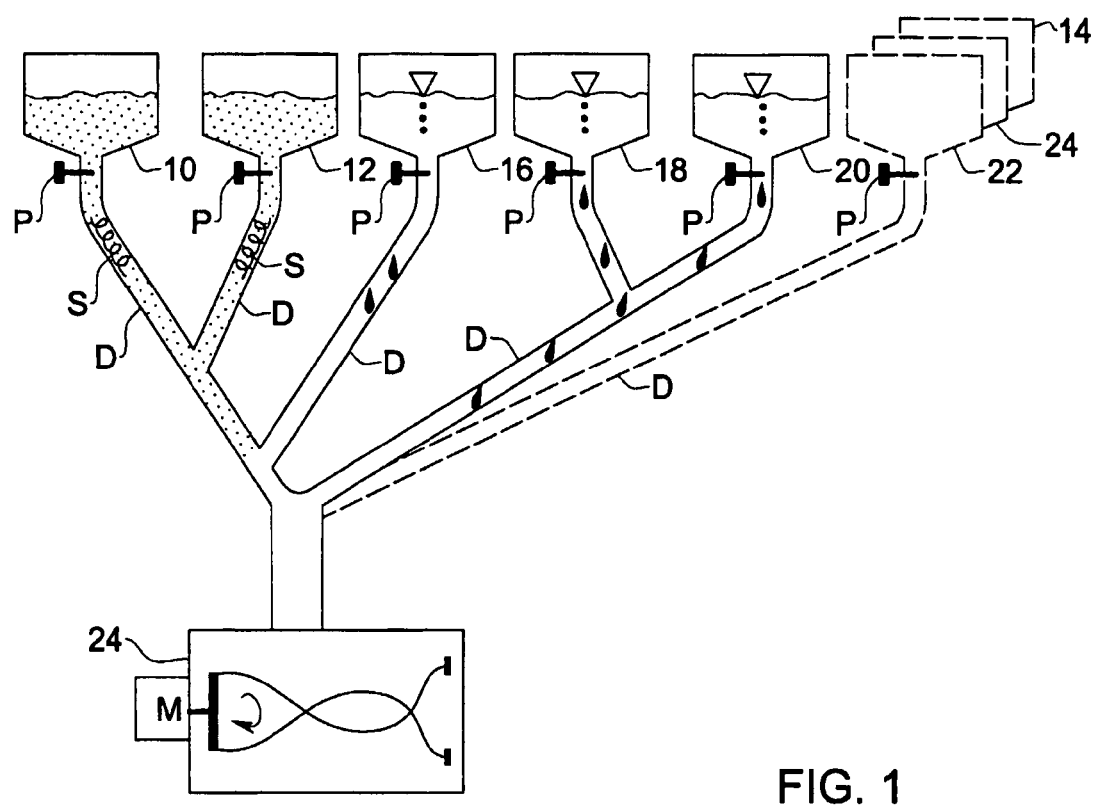
FIG. 1 is a schematic representation of a manufacturing process of a simulant material according to a first embodiment of the present invention, where said simulant material is in paste form.

Attention is first directed to FIG. 1 of the drawings illustrating a process for manufacturing simulant materials in accordance with the present invention. The manufacturing process utilizes a conventional chemical engineering system comprising a plurality of hoppers 10, 12 and 14 for containing a plurality of powdered or granulated material, and a plurality of liquid containers 16, 18, 20, 22 and 24 for containing different liquids, as will be exemplified hereinafter.

Each of the hoppers and containers is fitted with a controllable port P, typically governed by a controlled processing unit (not shown) for discharging precise amounts of material through said ports. Furthermore, each of the hoppers 10, 12 and 14 is fitted with a shaker/vibrator or a screw-type feeder S to ensure proper flow of the solid particles (powder or granular).

Extending from each of the hoppers and containers there are ducts D extending towards a large blender 24 which in the present example is a sigma blade type blender operated by a motor M.

As disclosed hereinbefore, in accordance with one embodiment of the invention, the simulant material is in a paste/putty like form which may be obtained directly from the mixer 24. Such paste-like material may then be removed from the mixer 24 and may either be collected into suitable containers or putty dispensing tubes, e.g. of the type used with putty dispensers 30 as in FIG. 3A, wherein upon squeezing a trigger 32 the paste/putty material 36 is dispensed and may be applied directly on any surface whereby it is likely to adhere owing to its pasty nature. Alternatively, the paste-like simulant material 36 may be injected into containers of different shapes to simulate different conditions.

Figure 2:
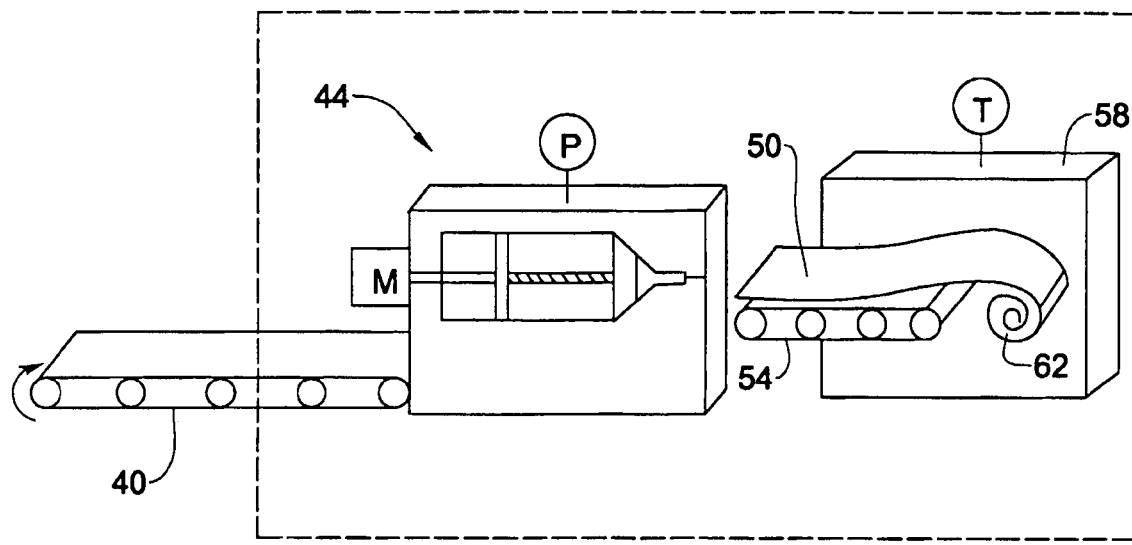
FIG. 2 is a schematic representation of a manufacturing process of a simulant material according to a first embodiment of the present invention where said simulant material is in solid form.

In accordance with a second embodiment, the simulant material is formed into solid state and further attention is now directed also to FIG. 2 of the drawings illustrating further steps of the method for obtaining such solid simulant material. The paste/putty like stimulant material obtained after the mixing stage in mixer 24 is then withdrawn and transferred, e.g. by belt conveyor 40, to a vacuum extruder generally designated at 44. This stage of the process takes place under vacuum wherein the pasty material is extruded, whilst removing residual air and compressing the pasty material into any desired form. In the particular embodiment, the material is formed into a continuous flat strip of material 50 placed on a second conveyor belt 54 which transfers the material into a drier 58 wherein the simulant material is solidified and reaches its final stage as a solid, though pliable/foldable material collected in the form of a roll of material 62, or flexible sheets obtainable at various thicknesses.

The following is an example of a method of obtaining a simulant explosive material. Hopper 10 comprises explosive material, e.g. RDX, hopper 12 comprises a powdered agent, e.g. silica, container 16 comprises a siliconic polymer, (e.g. PDMS—polydimethyl siloxsane), container 18 comprises a cross-linking agent, (e.g. tetra-ethyl silicate) and container 20 comprises an organo-metallic catalyst (e.g. tin dibutyl laurate). The above ingredients are obtained and introduced into the mixer 24. In accordance with one particular embodiment the following volumetric ratio is used:

| | |
|---|---|
| RDX | 17%; |
| Silica | 30%; |
| PDMS | 49.4%; |
| Tetra-ethyl silicate | 3.5%; |
| Tin dibutyl laurate | 0.1%. |

The ingredients are mixed for approximately 1 hour to thereby obtain a homogenous paste-like material which is then transferred into the vacuum extruder 44 to compress the material under vacuum conditions, so as to remove residual air and obtain a pasty homogenous material, which is then polymerized and cross-linked within the oven 58, e.g. by placing it overnight in a temperature of about 50° C.

However, if it is required to retain the simulant material in its paste-like form, then the cross-linking agent (tetra-ethyl silicate in the present example) and the catalyst (tin dibutyl laurate in the present example) are not fed into the mixture.

Having given the above example, it should be apparent to a person versed in the art that different parameters may be manipulated so as to obtain the simulant material at different levels of viscosity. Such parameters may be concentration of the additives or mixing speed and time at mixer 24.

Amongst the additives which may be added into the mixture are, for example, color agents, odor agents, different drugs so as to impart the simulant material features also as a drug simulating material. The explosive material used for the mixture may be a single material or may be a cocktail of materials to thereby simulate several such materials. As an example, RDX may be used side by side with PETN.

Other additives which may be used are, for example, fire retarding agents, metallic powder detectable by metal detectors (magnetometers), e.g. ferrum powder or tungsten powder, the latter being preferable as it has increased specific weight.

Figure 3A:
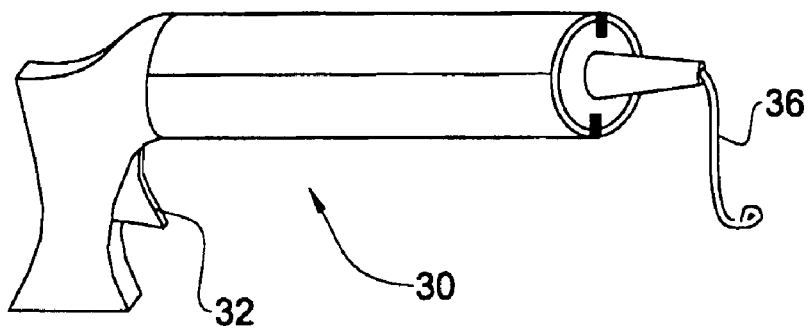
FIGS. 3A-3E are samples of simulant material articles according to the present invention, formed in different shapes.
Figure 3B:
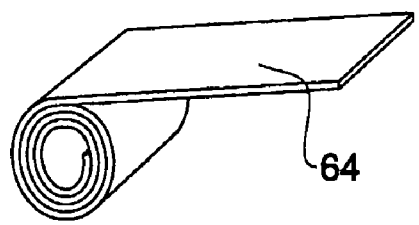
Figure 3C:
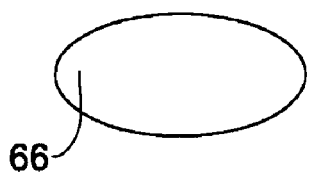
Figure 3D:
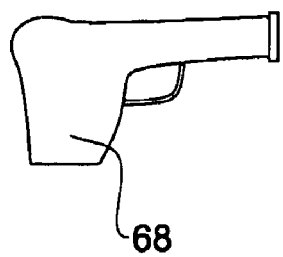
Figure 3E:
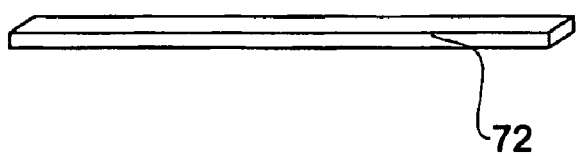

The hardened material obtained after the cross linking process at oven 58 may be processed in different forms. For example, it may be kept as a continuous sheet-like material (FIG. 3B). The material 64 may be cut by any suitable tool (scissors, knife, etc.) per demand. FIG. 3C illustrates a simulant material 66 cut in the shape of a sole simulating a sole-like article of the type commonly used by drug smugglers. In this case it is likely that the article is mixed also with drug simulating agents. In the embodiment of FIG. 3B the simulant material 68 is cut in the shape of a weapon, a pistol in the present example, and in this case it is likely that a metallic powder is embedded in the simulant material, to be detectable also by a magnetometer. FIG. 3A illustrates a simulant material 72 formed in the shape of a long rod, e.g. having a square cross-section, a cylindrical cross-section, a tubular cross-section, etc. to be used in different applications.

Whilst some embodiments have been described and illustrated with reference to some drawings, the artisan will appreciate that many variations are possible which do not depart from the general scope of the invention, mutatis, mutandis.

The invention claimed is:

1. A simulant material for simulating hazardous materials substantially devoid of non-inherently associated volatiles, comprising a quantity of at least one explosive material and at least one inert material; wherein the simulant material is a non-explosive material and is in the form of a homogenous, flexible and non-particulated material.

2. A simulant material according to claim 1 in a solid or a pasty/putty form.

3. A simulant material according to claim 1, wherein the explosive material is a cocktail of explosive materials.

4. A simulant material according to claim 1 further comprising pigmentation agents which impart the simulant material a distinguishable color.

5. A simulant material according to claim 1, further comprising at least one additive for simulating one or more chemical war agent or for simulating one or more drugs.

6. A simulant material according to claim 1, further comprising masking agents that mask the scent of the at least one explosive material.

7. A simulant material according to claim 1, being chemically or mechanically stable.

8. A simulant material according to claim 1, further comprising metallic material in powdered form, homogeneously dispersed within the simulant material, for imparting it with a magnetic properties.

9. A simulant material according to claim 8, wherein the metallic material is tungsten.

10. A simulant material according to claim 1, being resistant to UV or IR radiation.

11. A simulant material according to claim 1, being heat resistant within the range of about −54° C. to +70° C.

12. A simulant material according to claim 1, being stable under X-ray radiation conditions.

13. The simulant material according to claim 1, wherein the simulant material is configured to be suitable for training of detection dogs, calibrating sensitive analytical instruments or for training personnel in working with detection dogs or operation of sensitive analytical instruments.

14. Simulating articles made of a simulant material according to claim 1.

15. A simulant material according to claim 1, in the form of a flexible sheet.

* * * * *

UNITED STATES PATENT AND TRADEMARK OFFICE
CERTIFICATE OF CORRECTION

| | | |
|---|---|---|
| PATENT NO. | : 7,932,089 B2 | |
| APPLICATION NO. | : 11/660737 | |
| DATED | : April 26, 2011 | |
| INVENTOR(S) | : Yael Cohen-Arazi et al. | |

It is certified that error appears in the above-identified patent and that said Letters Patent is hereby corrected as shown below:

Title Page and Col. 1
Please delete the following on the front page of the patent:

"(54) SIMULTANT MATERIAL AND METHOD FOR MANUFACTURE THEREOF"

replace with the following on the front page of the patent:

-- (54) SIMULANT MATERIAL AND METHOD FOR MANUFACTURE THEREOF --

Signed and Sealed this
Thirty-first Day of May, 2011

David J. Kappos
*Director of the United States Patent and Trademark Office*

UNITED STATES PATENT AND TRADEMARK OFFICE
CERTIFICATE OF CORRECTION

PATENT NO. : 7,932,089 B2
APPLICATION NO. : 11/660737
DATED : April 26, 2011
INVENTOR(S) : Yael Cohen-Arazi et al.

Page 1 of 1

It is certified that error appears in the above-identified patent and that said Letters Patent is hereby corrected as shown below:

In the Claims

Column 6, Claim 1, Lines 18-20
Please delete "wherein the simulant material is a non-explosive material and is in the form of a homogenous, flexible and non-particulated material."
and replace with --wherein the at least one explosive material is homogenously distributed throughout the at least one inert material, and wherein the simulant material is a non-explosive material that is both flexible and non-particulated.--

Signed and Sealed this
Thirty-first Day of December, 2013

Margaret A. Focarino
*Commissioner for Patents of the United States Patent and Trademark Office*